UNITED STATES PATENT OFFICE.

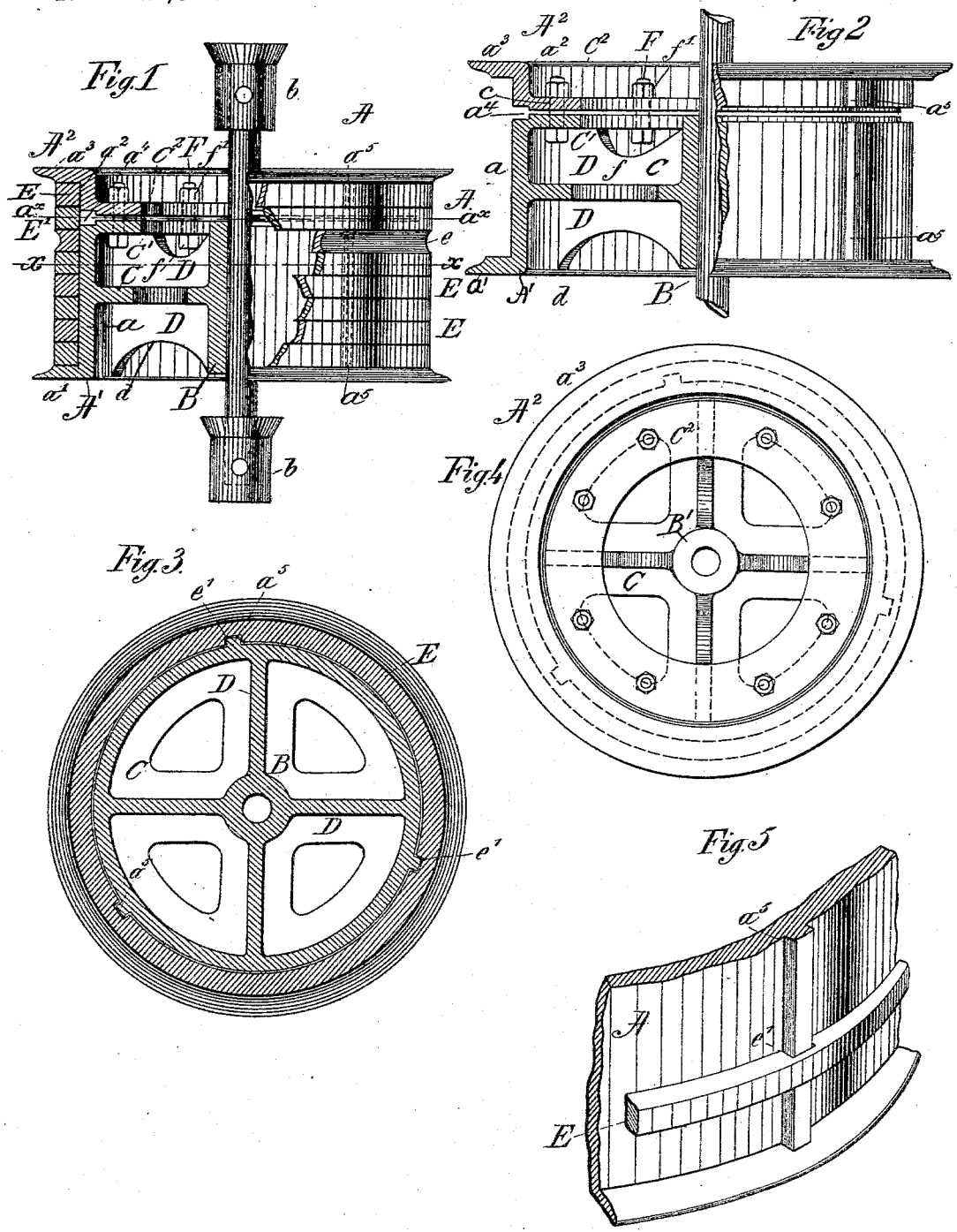

ROBERT GILLHAM, OF KANSAS CITY, MISSOURI.

PULLEY.

SPECIFICATION forming part of Letters Patent No. 412,335, dated October 8, 1889.

Application filed January 7, 1889. Serial No. 295,637. (No model.)

*To all whom it may concern:*

Be it known that I, ROBERT GILLHAM, a citizen of the United States, residing at Kansas City, in the county of Jackson and State of Missouri, have invented certain new and useful Improvements in Pulleys; and I do hereby declare the following to be a full, clear, and exact description of the invention, such as will enable others skilled in the art to which it appertains to make and use the same, reference being had to the accompanying drawings, forming a part of this specification.

The object of my invention is, first, to change the peripheral bearing depression in a pulley in the line of its axis to meet the alternate changes in position of a traveling cable in which the pulley is in line, and, second, to enable the series of rings in the periphery of the pulley to be drawn in close relation between the detachable parts.

My invention further consists in the novel construction and combination of parts, which will be first fully described, and specifically pointed out in the claims.

Figure 1 is a view of the pulley in a horizontal position and partly in vertical section, showing a series of interchangeable rings broken away on the periphery of the pulley, the removable flanged section and securing-bolts, and the means whereby the rings are keyed upon the periphery of the pulley. Fig. 2 is a view of the pulley similar to that seen in Fig. 1, with the rings removed. Fig. 3 is a horizontal sectional view of the pulley, taken upon the line $x\,x$ of Fig. 1. Fig. 4 is a plan view of the pulley, as seen in Fig. 2. Fig. 5 is a detail view of the periphery of the pulley, showing the transverse flange and a portion of one of the grooved rings.

Similar letters of reference indicate corresponding parts in all of the figures.

Referring to the drawings, A represents a horizontal drum-shaped pulley in separate parts $A'\,A^2$. The portion $A'$ of the pulley is made with a wide periphery $a$, at right angles to which from the edge portion on the lower side of the pulley extends circumferentially the flange $a'$.

B is the hub, which extends in the direction of its axis a distance corresponding to the width of the periphery $a$ of the pulley. Extending radially from the hub B, from a point equally distant from its opposite ends to a point intermediate from the edges of periphery $a$ of the pulley, is cast or formed the web C, and extending radially from the end portion of the hub B to the periphery $a$ upon the side of the pulley opposite to that having flange $a'$ is cast or formed the web $C'$. Extending from the hub B, in the direction of its axis and at right angles to and from the opposite sides of the webs C to the web $C'$ in one direction and to the end of the hub B in another direction, and radially from said hub to the periphery $a$ of the pulley, are cast or formed the walls D D, the edge portions of which opposite the web $C'$, and also extending outwardly from web C, are cut away at $d$ from the hub B to the periphery $a$ in an inwardly-curved direction toward the web C.

The portion $A^2$ of the pulley is detachable from the portion $A'$, and consists of a narrow peripheral portion $a^2$, corresponding in diameter to the periphery $a$, and from the edge portion of the detachable part of the pulley $A^2$ extends circumferentially a suitable flange $a^3$. Said portion $A^2$ of the pulley is made with a short hub $B'$, and extending radially from said hub to the edge of the peripheral portion $a^2$, opposite and to provided with the flange $a^3$, is cast or formed integral therewith the web $C^2$, so that when the parts $A'\,A^2$ of the pulley are joined together the webs $C'\,C^2$ are in close relation. In the peripheral portion $a\,a^2$ of the pulley at the line $a^\times$ of division between the separate parts $A'\,A^2$ of the pulley is made a concentric groove $a^4$. Upon the outer surface of the periphery $a$ of the portion $A'$, and also on the periphery $a^2$ of the portion $A^2$ of the pulley and in a transverse relation are cast or formed the flanges $a^5\,a^5$, which are placed a suitable distance apart in relation to each other and in line with respect to the separate parts $A'\,A^2$ of the pulley.

The bearing-surface of the pulley consists of a series of concentric interchangeable rings E E, of uniform width, the diameter of which slightly exceeds that of the periphery of the parts $A'\,A^2$ of the pulley. In the ring E, which is in line with the traveling cable, is made the concentric groove $e$. As many of the rings as desired may be grooved in a corresponding manner, so as to be interchangeable with a ring which has become worn. In a transverse relation to and in the inner side of the rings E E are cut, at the relative distances apart to the flanges $a^5$ on the periphery of the pulley, the grooves $e'$ $e'$, so that when the rings are placed upon the pulley the said grooves will register with the flanges $a^5$ and key the rings in place. The rings E are first placed on the portion A' of the pulley in successive order, the grooved ring taking a place against the flange $a'$, or at any desired height, and at the point of division between the separate parts of the pulley the ring E' is then placed over the groove $a^4$. The portion $A^2$, which is also provided with a ring E, is then laid upon the portion A' of the pulley, so as to bring the rings closely together. Through the webs C' $C^2$, at short distances radially from the hub B and the periphery $a$, is made the perforations $c$ $c$, through which are inserted the screw-threaded bolts F F, upon the ends of which bolts are the heads $f$ $f$, and upon the opposite ends are the nuts $f'$ $f'$. As the nuts $f'$ $f'$ are turned upon the bolts F F the webs C' $C^2$ are drawn closely together and the rings upon the portion of the grooved periphery $a^2$ of detachable part $A^2$ and also the rings upon the portion A' on the periphery $a$ of the pulley are drawn closer in relation to each other, thus obviating the necessity of placing washers between the said rings.

In the construction of the pulley, as hereinbefore described, a saving is effected over the old forms of pulley, which is discarded when the groove has become so worn as to penetrate through the inner side of the peripheral flange. The rings forming the bearing-surface are obviously changeable, and as the wear unfits them for use are replaced with less expense and readily adapted to the plane of the traveling cable, which in the conduits of cable railways, to which the pulley is particularly of service, the varying requirements are subserved.

Having fully described my invention, what I now claim as new, and desire to secure by Letters Patent, is—

1. The combination, with a pulley having a flanged peripheral portion, of a series of interchangeable rings keyed to the said peripheral portion, substantially as shown and described.

2. A pulley having its peripheral portion provided with transverse flanges, in combination with a bearing composed of interchangeable rings, said rings having transverse grooves adapted to register with and receive said flanges, as shown and described.

3. A pulley consisting of separate detachably-secured parts having a transverse flange, and a peripheral bearing consisting of a series of interchangeable rings, said pulley having a concentric groove in the periphery and at the line of division of said detachable parts, for the purpose described.

ROBERT GILLHAM.

Witnesses:
  E. C. TOVY,
  S. L. C. HASSON.